June 2, 1964  M. MAYRATH  3,135,376
BALE CONVEYOR UNLOADER
Filed May 15, 1961  2 Sheets-Sheet 1
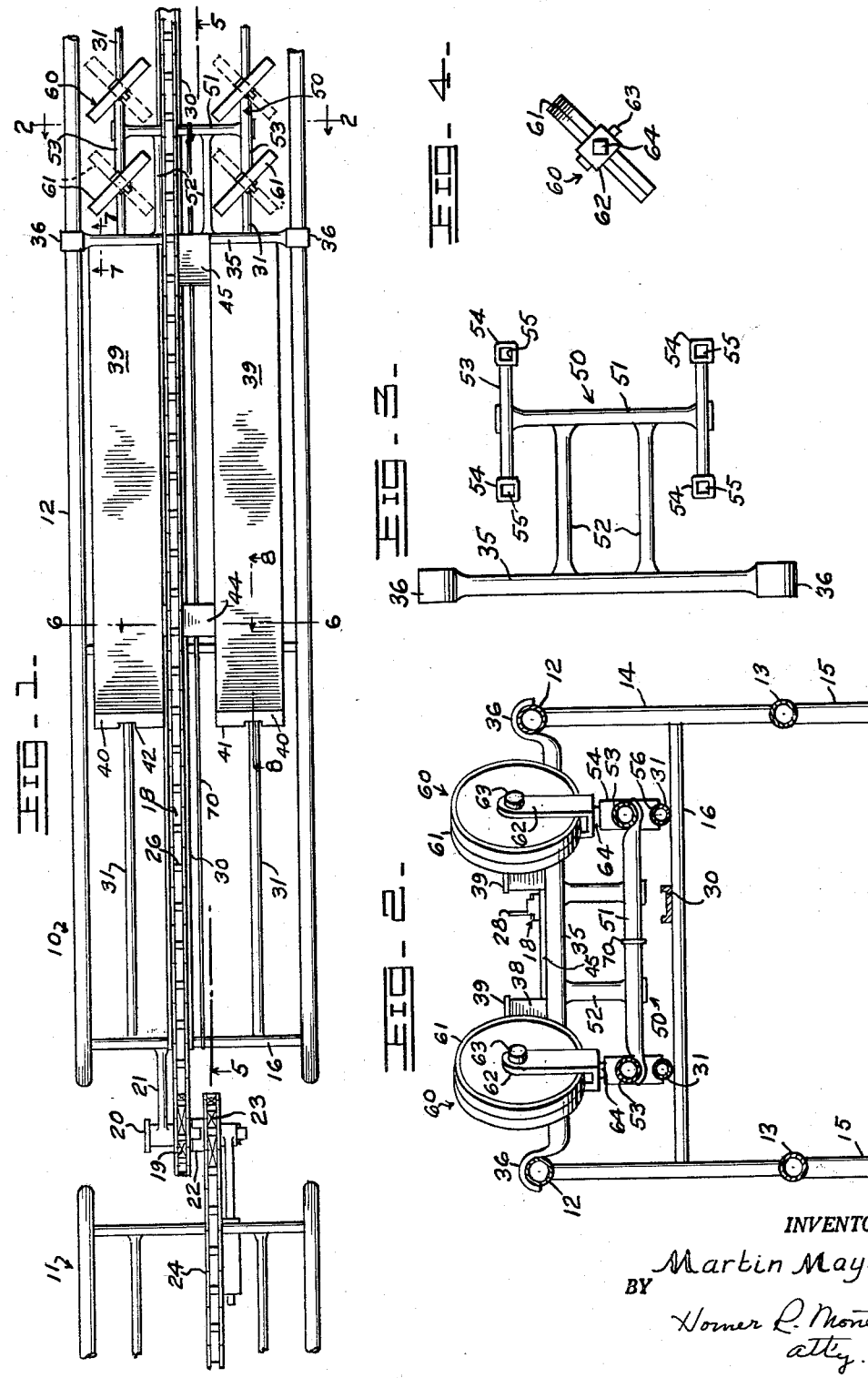
INVENTOR:
Martin Mayrath
BY Homer R. Montague
atty.

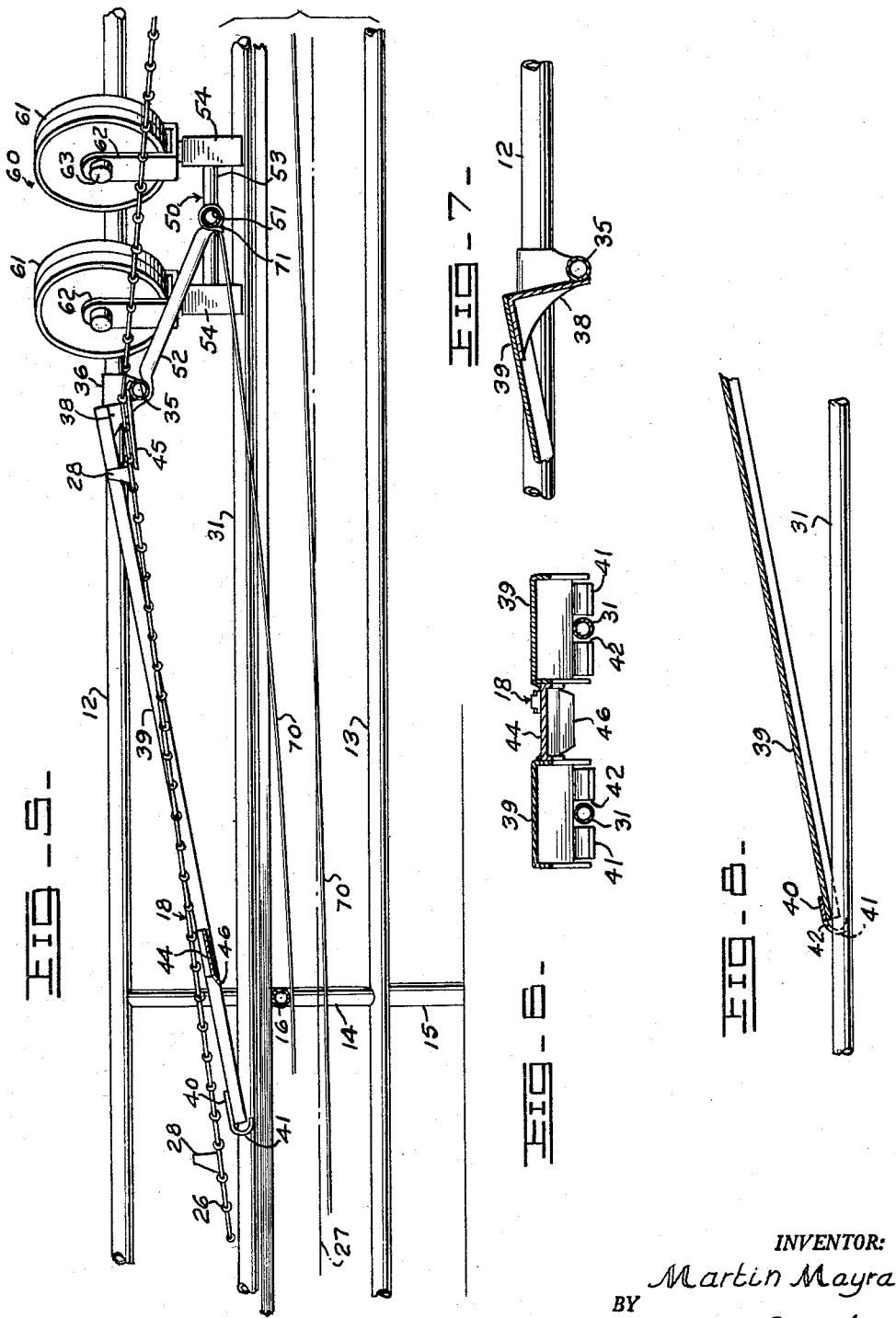

United States Patent Office 3,135,376
Patented June 2, 1964

3,135,376
BALE CONVEYOR UNLOADER
Martin Mayrath, 10707 Lennox Lane, Dallas 29, Tex.
Filed May 15, 1961, Ser. No. 110,173
2 Claims. (Cl. 198—185)

This invention relates to a conveyor with unloading means, and more particularly to a power driven conveyor for moving articles such as hay bales and unloading such articles from either side of the conveyor at any location along the length thereof.

It has been proposed to move articles such as hay bales along conveyors through the medium of propelling elements carried by conveyor chains, and to discharge the bales or other articles from one side of the conveyor at selected points according to the locations in which it is desired to place or store the bales. Such unloading devices ordinarily are in the form of angularly arranged deflectors which, when the bales are pushed thereagainst by the propelling elements of the chain, cause the bales to be angularly deflected from the conveyor. The article moves under substantial frictional engagement with the deflectors and substantial force must be delivered to the article by the conveyor chain. This not only tends to put the conveyor chain under considerable strain but also causes the propelling elements to tend to tear or damage the article, such as the pulling loose of hay from a hay bale, and may also at times cause the propelling element to break the bale tie.

An important object of the present invention is to provide an article kick-off or unloading means associated with a chain or other endless conveyor, in which friction is substantially reduced by the use of rotating deflecting means, thus requiring little power for the unloading of a hay bale or other article from a conveyor without damage to the conveyor or to the article being unloaded.

A further object is to provide an apparatus of this character wherein a plurality of supporting rollers are employed for wholly supporting the bale at the unloading point, thus permitting the bale to be easily unloaded with minimum force and with no damage to the bale or other article.

A further object is to provide novel means associated with the unloading rollers for progressively elevating the bale as it approaches the rollers to facilitate movement of the bale onto the rollers, thus permitting the rollers to be used with a conventional conveyor of the chain type without alteration in the conveyor itself.

A further object is to provide, in combination with a conveyor of the type referred to, ramp means for elevating each bale or other article as it approaches the discharge rollers, and to so control movement of the chain that each successive propelling element becomes disengaged from the hay bale or other article approximately at the point where it is to be wholly supported by the rollers, thus preventing the propelling elements from tearing or otherwise damaging the bales.

A further object is to provide ramp means at a predetermined angle to the lengthwise conveyor axis and along which successive bales or the like are elevated for movement over the unloading rollers, and to provide means for causing the propelling conveyor chain to partake of movement at an angle to the said axis which is less than the angle of inclination of the ramp means, so that each propelling element of the chain is automatically withdrawn from the hay bale at the point where the latter is ready to be wholly supported by the unloading rollers.

A further object is to provide unloading means of the type referred to wherein the unloading rollers may be arranged very readily at selected angles to discharge the bales or other articles from either side of the conveyor.

A further object is to form the unloading means and elevating ramp means as a unit, so as to permit it to be readily adjusted longitudinally along the conveyor to discharge the articles at any desired point.

Other objects and advantages of the invention will become apparent during the course of the following description of a preferred embodiment of the invention, given by way of example.

In the drawings I have shown one embodiment of the invention. In this showing:

FIGURE 1 is a plan view of portions of two articulated conveyor sections of the chain type, showing the invention applied to one of such section;

FIGURE 2 is a section on line 2—2 of FIGURE 1;

FIGURE 3 is a top plan view of the unloading roller supporting frame;

FIGURE 4 is a bottom plan view of one of the unloading rollers and its carrying yoke;

FIGURE 5 is a somewhat enlarged fragmentary section on line 5—5 of FIGURE 1;

FIGURE 6 is a transverse sectional view on line 6—6 of FIGURE 1;

FIGURE 7 is an enlarged detail section on line 7—7 of FIGURE 1; and

FIGURE 8 is a fragmentary longitudinal section on line 8—8 of FIGURE 1.

Referring particularly to FIGURES 1, 2 and 5, the numerals 10 and 11 indicate as a whole a pair of articulated conveyors arranged to assume different angles to the horizontal with respect to each other in accordance with a known practice in conveyors of this kind; for example, as shown in Wilcoxen patent No. 2,951,577 of September 6, 1960. It will become apparent, however, that the present invention is not limited to use with articulated conveyors but is equally applicable for use with a single unitary conveyor. It also will be apparent that where articulated conveyors are used, the invention may be employed selectively with any of the conveyor sections. The use of the invention in this case will be described in conjunction with the conveyor section 10, and it may be assumed that each conveyor section is substantially identical to the others.

The conveyor section 10 comprises a main frame formed of upper and lower horizontal rails 12 and 13 connected at spaced points by supporting posts 14. The rails 13 may rest directly on the ground or other supporting surface or may be provided with supporting legs 15. The posts 14 are connected at spaced points by suitable transverse bars 16.

The conveyor 10 is provided with a conveyor chain 18 one end of which passes around a sprocket 19 rotatably supported by a bearing 20 carried by a reach member 21 welded or otherwise fixed to one of the transverse bars 16 at the inlet end of the conveyor 10. The sprocket 19 is connected through a positive drive member 22 to a sprocket 23 around which passes a chain 24 at the outlet end of the conveyor section 11. It will be understood that similar sprocket means (not shown) will be arranged at the outlet end of the conveyor section 10 for the passage therearound of the chain 18. This chain has an upper run 26 shown in FIGURES 1 and 5 and a lower run (not shown) which follows approximately the dot-and-dash line 27 in FIGURE 5. At spaced points, the conveyor chain is provided with upstanding pusher or propelling elements 28.

Normally the upper run 26 of the chain operates in a channeled pan or longitudinal guide 30 supported on the cross members 16, thus causing the upper run of the chain normally to travel in a horizontal line so that the pusher elements 28 will move the articles along the conveyor. The articles will be primarily supported on spaced parallel rails 31 which carry the load of the articles while the chain moves them along the conveyor.

The mechanism forming the principal part of the present invention comprises a cross bar 35 of generally tubular cross section having its ends flattened and then arched as at 36 (FIGURE 2) to be supported upon and slidable along the side rails 12. The cross bar 35 has welded thereto supporting brackets 38 (FIGURE 7), the tops of which are welded to a pair of longitudinally extending spaced ramps 39 which may be of inverted channel section as shown in FIGURE 6. These ramps slope downwardly, at a predetermined angle to the (herein) horizontal lengthwise axis of the conveyor section, toward the in let end of the conveyor, and are provided at their lower ends with guide plates 40 welded thereto and having downwardly and inwardly turned ends 41 notched as at 42 to receive therebetween the rails 31, thus preventing lateral movement of the lower ends of the ramps 39. Toward their lower ends, the ramps are braced by a cross plate 44 welded to both ramps and depressed somewhat from the plane of the tops of the ramps as shown in FIGURES 5 and 6, for a purpose to be described. Between the upper ends of the ramps is arranged a wear plate 45 welded to the cross member 35 and over which the upper run of the chain moves as indicated in FIGURE 5. This wear plate supports the chain in a portion of the upper run thereof in the region of the ramps 39 so that such portion of the chain passes upwardly from the inlet end of the conveyor at an angle to the horizontal less than the angle of inclination of the ramps 39. This difference in inclination and the positioning of the upper run of the conveyor chain is such that each pusher element is released from (or in effect withdrawn from) the hay bale or other article being propelled, approximately at the point of location of the pusher element 28 shown in FIGURE 5 adjacent the upper ends of the ramps 39, for a purpose to be described. The upper run of the chain normally travels above and free of the cross plate 44, but is depressed into sliding engagement therewith by the hay bale or other article being propelled thereover by the chain. Thus, spaced portions of the chain will be supported by the members 44 and 45, and each pusher element will be maintained in propelling engagement with the hay bale moving upwardly along the ramps. The end of the cross member 44 toward the inlet end of the conveyor is preferably inclined downwardly as at 46 to insure that the chain will not hang on the leading edge of the cross member 44 as it moves thereover.

An unloading wheel supporting frame indicated as a whole by the numeral 50 is arranged at the side of the cross member 35 opposite the ramps 39. This supporting frame comprises a tubular cross member 51 connected to the cross member 35 by parallel inclined tubular braces 52, opposite ends of which are flattened to extend partly around the members 35 and 51 to be effectively welded thereto. Each end of the cross member 51 is flattened to extend partially around, and welded to, parallel longitudinally extending tubular members 53 to each end of each of which is welded a vertical socket 54 having a polygonal vertical opening 55. These openings are preferably square and located as shown in FIGURE 3. The lower ends of the sockets 54 may be shaped as at 56 (FIGURE 2) to correspond to the cross sectional shape of the rails 31 to slide therealong.

A plurality of unloading rooler assemblies, each indicated as a whole by the numeral 60, is employed, such assemblies corresponding in number to the sockets 54. Each roller assembly 60 comprises a roller 61 having a supporting yoke 62 provided at the ends of the arms thereof with an axle 63 to rotatably support the associated roller. The base of each yoke 62 is provided with a downwardly extending polygonal projection 64 (FIGURE 4). These projections and the openings 55 in the sockets 54 are preferably square and the sides of the projection 64 are arranged at 45° to the plane of each associated roller 61. Therefore, the rollers may be placed in either the solid or dotted line positions shown in FIGURE 1, depending upon the side of the conveyor from which the articles are to be discharged.

It will be apparent that the ramps 39, cross member 35, frame 50 and roller assemblies 60 are connected together to move as a unit longitudinally of the conveyor. Very simple and practical means is provided for adjusting the position of the unloading means referred to, longitudinally of the conveyor, to discharge hay bales or other articles at the desired points. It will be apparent that the friction of the chain passing over the wear plate 45 exerts a force tending to move the unloading unit to the right in FIGURES 1 and 5. A rope or cable 70 is tied at one end as at 71 to the cross member 51 and extends to the inlet end of the machine, thence around the adjacent cross member 16 and back through the conveyor into the hay loft or the like. By releasing the latter end of the rope or cable, with the conveyor running, the drag of the chain on wear plate 45 will effect movement of the discharging means along the conveyor toward the right in FIGURE 5, and when the desired discharge point on the rollers 61 is reached, the free end of the rope or cable may be made fast. If it is desired to move the discharge means to the left in FIGURES 1 and 5, the free end of the rope is pulled to move the discharge means to the desired point, whereupon the free end of the rope is again made fast.

*Operation*

In the normal operation of the conveyor, the upper run of the chain 18 moves along in, and is supported by, the longitudinal guide 30. The discharge means is mounted as shown in FIGURES 1 and 5 with the upper run of the chain pulled upwardly to pass over the wear plate 45. Bales are loaded onto the rails 31 at the inlet end of the conveyor 10 or are supplied thereto from the outlet end of the conveyor 11, and such bales will be propelled to the right in FIGURES 1 and 5 by the pushers 28. The weight of the bale causes the upper run of the chain to be depressed near the lower ends of the ramps 39, but downward movement of the chain is limited by the cross member 44, thus preventing unduly loading the chain and assuring continued engagement of the following pusher 28 with the bale. The member 44 also acts as a tie between the ramps 39.

The bale will be propelled by the chain upwardly along the ramps 39 and the down-turned ends 41 of the guide plates 40 insure against the hanging of the bale against the lower ends of the ramps. As the leading edge of the bale passes beyond the upper ends of the ramps, the following pusher 28 continues to cause the bale to swing upwardly over the adjacent two rollers 61 and at the point where the bale becomes over-balanced, as its center of gravity passes beyond the points of engagement with these rollers, the bale will drop down flat on all four of the rollers 61. These rollers turn very freely and the forward motion already imparted to the bale will provide it with sufficient inertia to cause it to be discharged from one side or the other of the conveyor. Assuming that this fails to take place, the next following bale will cause the first bale to be moved quickly from the rollers 61. The pusher 28 adjacent the upper ends of the ramps 39 is in limited engagement with the bale at the time the latter is ready to swing over onto the tops of the rollers, and accordingly the pusher 28 is quickly released from the bale as it tips over onto all four rollers, without damage and without any danger that the pusher will break the bale ties. The free rotation of the rollers 61 greatly reduces the force necessary for the discharging of each successive bale. This relieves strain on the chain and reduces the power necessary for the operation of the chain, and the arrangement of parts, as stated, is such as to eliminate any damage to the bale or its ties.

When sufficient bales have been discharged from one side of the conveyor and it is desired to unload bales from the opposite side of the conveyor, it merely is necessary to lift each roller free of its socket 54, turn the roller on a vertical axis 90° and re-insert its projection 64 in the associated socket. Thus in a matter of seconds, merely by changing the rollers, the bales or other articles may be discharged from either side of the conveyor.

As previously stated, the unloading means may be arranged at any desired point merely by pulling on the free end of the rope or cable 70 to pull the unloading mechanism to the left in FIGURES 1 and 5; or by releasing the free end of the cable, the friction of the chain riding over the wear plate 55 will move the unloading mechanism in the opposite direction.

It also will be apparent that the device may be used in connection with a known conveyor of the type referred to without alteration of any of the parts of the conveyor itself. One link of the chain 18 may be detached from the adjacent link to swing a portion of the chain out of the way so that the unloading mechanism may be lifted vertically and placed in position on the conveyor. The disconnected links may again be attached to each other, whereupon the conveyor and unloading means is ready for use. Alternatively, and where the chain is not too tight, the mechanism may be slipped under the upper run of the chain from one side of the conveyor. The device also distributes its weight to various parts of the conveyor structure. The cross member 35 is supported on the side rails 12, the lower ends of the ramps 39 are supported by the rails 41 and, at a substantial distance from the lower ends of the ramps, the sockets 54 are supported by the rails 31.

The invention has been particularly described with reference to its use with a section of an articulated conveyor for hay bales or the like. However, it will be apparent to those skilled in the art that the invention is also applicable to other types of conveyors, and to conveyors for unloading articles other than hay bales. Hence the invention is not to be considered as limited to the particular details shown or described, nor to the specific application of the invention to which reference has been made, except in so far as may be required by the scope of the appended claims.

What is claimed is:

1. An unloading conveyor comprising a longitudinal supporting frame, an endless conveyor extending longitudinally of and within said frame and provided with upper and lower runs, a pusher carried by said endless conveyor for moving an article with said upper run, slide rails arranged on opposite sides of said upper run and on which an article is supported for sliding movement by said pusher, ramps arranged on opposite sides of said upper run and slidably supported at one end by said slide rails, said ramps sloping upwardly toward their other ends in the direction of movement of said upper run, a wear plate mounted between the last-named ends of said ramps and over which said upper run is adapted to slide, whereby said pusher engages the article until it nearly reaches said last-named ends of said ramps, unloading means connected to said wear plate and the last-named ends of said ramps to move therewith longitudinally of the conveyor, said unloading means being arranged beyond said last-named ends of said ramps for discharging an article from one side of said conveyor, movement of said endless conveyor over said wear plate tending to move said wear plate, said ramps, and said unloading means in the direction of movement of said upper run, and a flexible element connected at one end to said unloading means whereby the anchoring of the other end of said flexible element prevents movement of said ramps, said wear plate, and said unloading means in said direction and a pull on said flexible element moves such assembly of elements in the opposite direction.

2. In an unloading conveyor apparatus of the type having a longitudinal supporting frame, an endless conveyor extending longitudinally of and within said frame and provided with upper and lower runs, a pusher carried by said conveyor for moving an article with said upper run, and horizontally coplanar slide rails arranged on opposite sides of said upper run and on which an article is supported for sliding movement by said pusher, the improvement which comprises:

(a) a slidable unloader mechanism supported for longitudinal sliding movement along said slide rails,
(b) said mechanism including a pair of ramps disposed on opposite sides of said conveyor and having their lower ends substantially in the plane of said side rails, said ramps extending upward in the direction of motion of said upper run,
(c) a wear plate extending between the upper ends of said ramps and adapted to receive and support the upper run of said conveyor and to be frictionally engaged by said upper run to exert tractive force on said mechanism in the direction of conveyor motion,
(d) anti-friction rollers mounted on said mechanism beyond the upper end of said ramps in the direction of conveyor motion and projecting above the level of the upper ends of said ramps, the axes of said rollers being substantially horizontal but inclined in the horizontal plane to the direction of carriage travel, to divert an article on said conveyor sidewise off of the conveyor, and
(e) cable means attached to said mechanism to control its longitudinal sliding motion in response to said tractive force, as well as to move it in the opposite direction by the application of a superior force to said cable means.

References Cited in the file of this patent
UNITED STATES PATENTS

| | | |
|---|---|---|
| 1,534,334 | Stutsman | Apr. 21, 1925 |
| 2,063,431 | Grayson | Dec. 8, 1936 |
| 2,613,790 | Schottelkotte | Oct. 14, 1952 |
| 2,990,053 | Lance | June 27, 1961 |